(12) United States Patent
Li et al.

(10) Patent No.: US 8,032,641 B2
(45) Date of Patent: Oct. 4, 2011

(54) ASSYMETRIC TRAFFIC FLOW DETECTION

(75) Inventors: Qing Li, Cupertino, CA (US); Ronald Frederick, Mountain View, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 162 days.

(21) Appl. No.: 12/433,443

(22) Filed: Apr. 30, 2009

(65) Prior Publication Data

US 2010/0281168 A1 Nov. 4, 2010

(51) Int. Cl.
G06F 15/16 (2006.01)
(52) U.S. Cl. .................. 709/227; 709/220; 709/226
(58) Field of Classification Search ............ 709/227, 709/228, 229, 249, 220–222; 370/235, 503, 370/252–253, 508, 509, 514, 516, 518, 519, 389, 392, 520, 229, 230, 230.1, 231
See application file for complete search history.

(56) References Cited

U.S. PATENT DOCUMENTS

| | | | |
|---|---|---|---|
| 7,366,101 B1 | 4/2008 | Varier | |
| 7,599,283 B1 | 10/2009 | Varier | |
| 2002/0167960 A1 | 11/2002 | Garcia-Luna-Aceves | |
| 2003/0043792 A1 | 3/2003 | Carpini | |
| 2003/0152034 A1* | 8/2003 | Zhang et al. | 370/252 |
| 2007/0283023 A1* | 12/2007 | Ly et al. | 709/227 |

* cited by examiner

Primary Examiner — Wing Chan
Assistant Examiner — Ruolei Zong
(74) Attorney, Agent, or Firm — Baker Botts L.L.P.

(57) ABSTRACT

Methods, apparatuses and systems directed to detecting, and in some implementations, responding to, asymmetric routing in network deployments. In a particular embodiment, a first process detects asymmetric routing at connection initiation, while the second process can detect asymmetric routing that may after connection initiation.

18 Claims, 8 Drawing Sheets

ASSYMETRIC TRAFFIC FLOW DETECTION

TECHNICAL FIELD

The present disclosure general relates to detection of asymmetric routing associated with traffic flows between remote hosts.

BACKGROUND

In various enterprise network deployments that involve proxies or other intermediate network devices, such as secure web gateways and Wide Area Network (WAN) optimization devices, one or more proxies can perform client Internet Protocol (IP) address spoofing (also known as reflect client-IP or RCIP). For example, a proxy can terminate a Transport Control Protocol (TCP) connection with a client and, masquerading as the client, open a TCP connection with a server.

A known problem in such deployments is asymmetric routing, according to which the routed path for packets destined to the server may not be the same as the routed path for packets destined for the client or proxy. This condition can be relatively stable or dynamic and intermittent. Because RCIP proxies spoof the client (i.e., the proxy uses the client IP address), the packets transmitted by the server (such as a TCP SYN/ACK packet) may reach the client directly if the routed return path is not the same. In this instance, the client, having no state information for the connection, attempts to terminate the TCP connection between the proxy and the server by transmitting connection-terminating packets. For TCP connections, the client may transmit a TCP RESET packet. The proxy can detect the asymmetric routing condition when it receives the connection-terminating message (e.g., a TCP RESET) from the client.

Network firewalls, a commonly deployed device in many network architectures, can prevent the detection of asymmetric routing. For example, many firewalls tend to filter or block packets—such as TCP SYN/ACK packets transmitted from the server, and the like—for which no connection state information exists and/or the connection state information indicates that a given packet is not expected. The operation of the firewall, therefore, may prevent the proxy from detecting asymmetric routing because the packets transmitted by the server are blocked, preventing the client from transmitting a TCP RESET. Additionally, many firewalls tend to filter or block packets—such as TCP RST packets transmitted from the client, and the like—for which no connection state information exists and/or the connection state information indicates that a given packet is not expected. The operation of the firewall, therefore, may prevent the proxy from detecting asymmetric routing because the packets transmitted by the client are blocked.

SUMMARY

The present invention provides methods, apparatuses and systems directed to detecting, and in some embodiments responding to, asymmetric routing in network deployments. In a particular embodiment, a first process detects asymmetric routing at connection initiation, while the second process can detect asymmetric routing that may after connection initiation.

DESCRIPTION OF EXAMPLE EMBODIMENT(S)

A. Overview & Example Network Environment

Figure 1A:
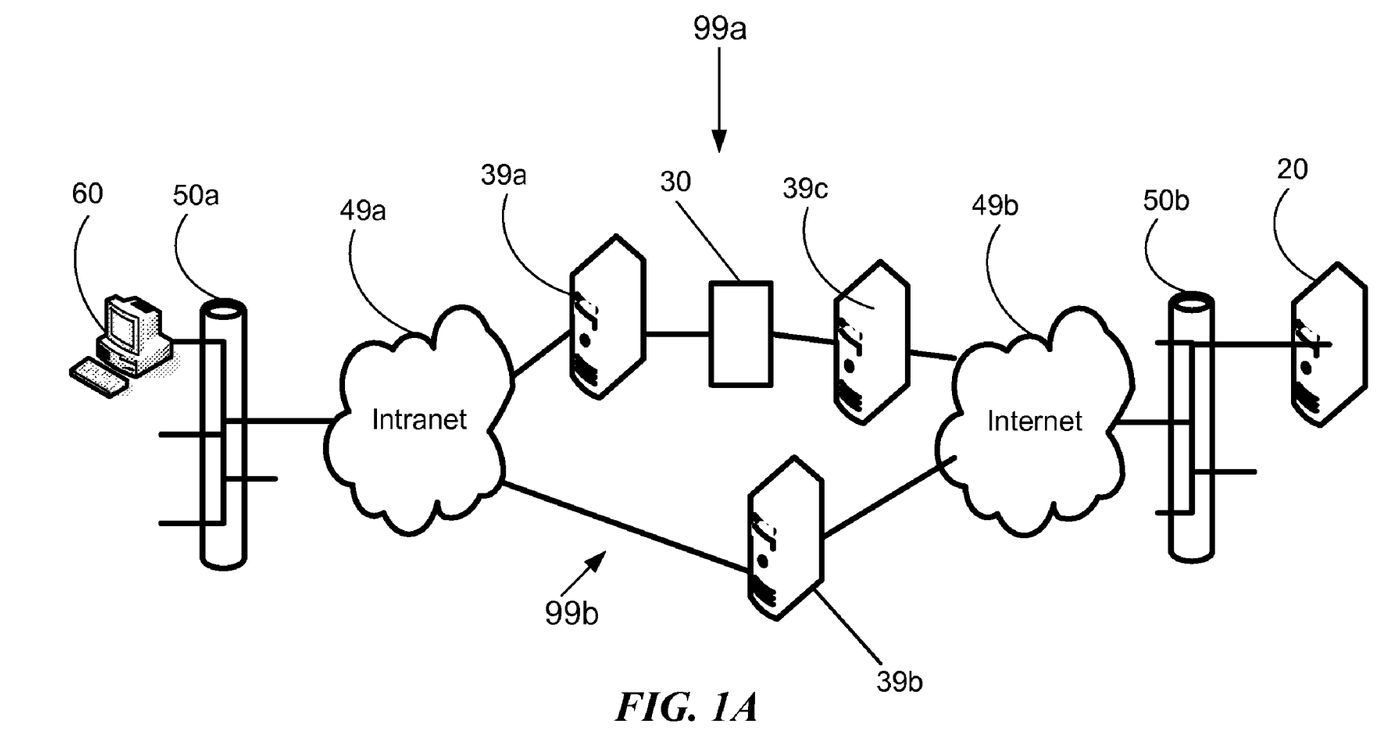
FIGS. 1A, 1B and 1C are schematic diagrams of computer network environments, in which particular embodiments of the present invention may operate.

FIG. 1A is a schematic representation of a network deployment, in which particular embodiments of the present invention have application. As FIG. 1A shows, the computer network environment may comprise one or more servers 20, one or more proxies 30, one or more firewalls 39, and one or more clients 60. According to the example deployment illustrated in FIG. 1A, a client 60 is connected to a network 50*a*, such as a Local Area Network (LAN), which itself is operably connected to intranet 49*a*. Similarly, server 60 is operably connected to LAN 50*b*, which is operably connected to Internet 49*b*. Network traffic between client 60 and server 20 may be routed over one or more network paths, where at least one network path includes network path segment 99*a* and at least another network path includes network path segment 99*b*. As FIG. 1A illustrates, network path segment 99*a* includes a proxy 30 and firewalls 39*a* and 39*c*, while network path segment 99*b* includes firewall 39*b*. Additional firewalls may be disposed at other points in the communications path between proxy 30 and client 60, as well as between proxy 30 and server 60.

Figure 1B:
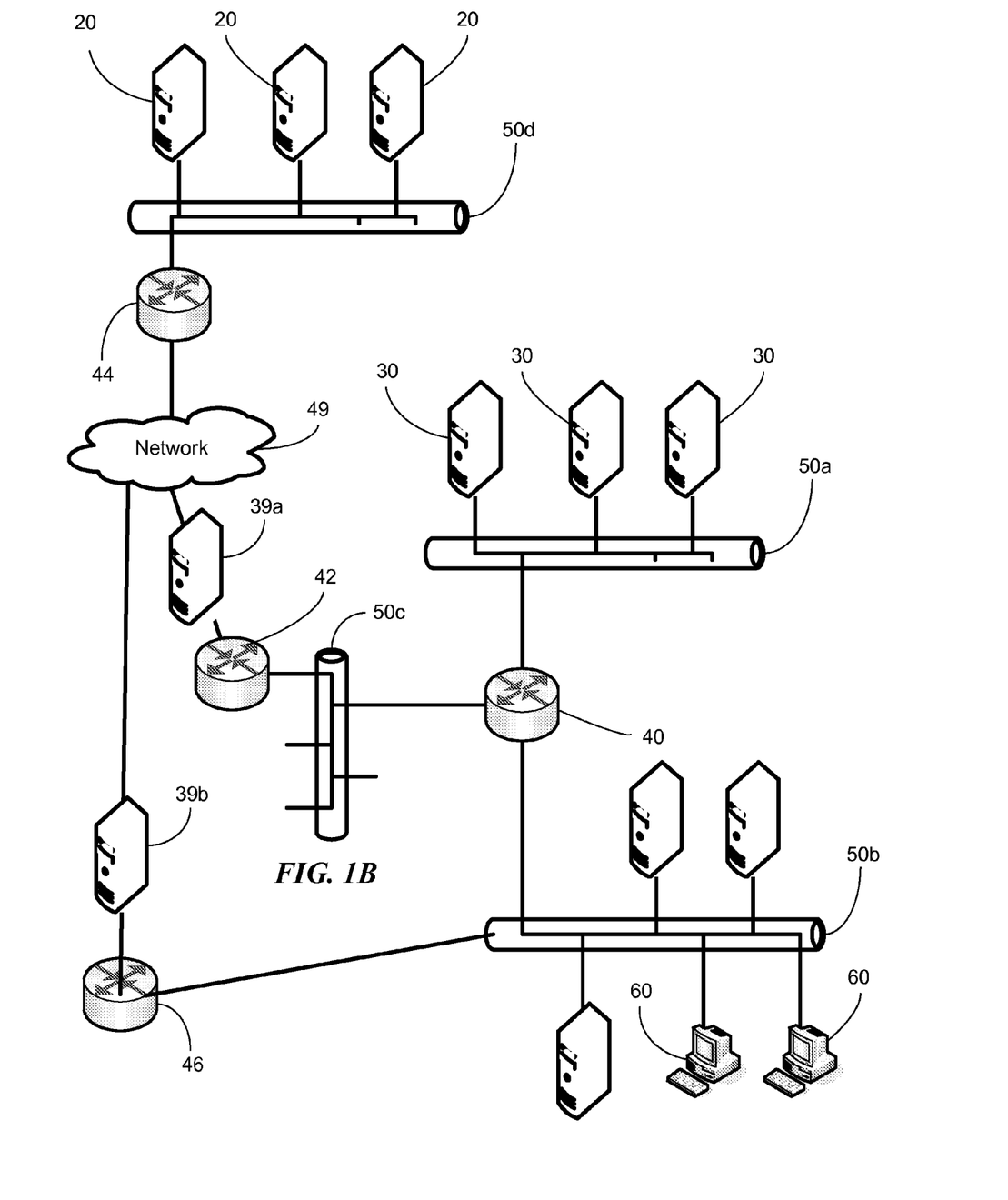
Figure 1C:
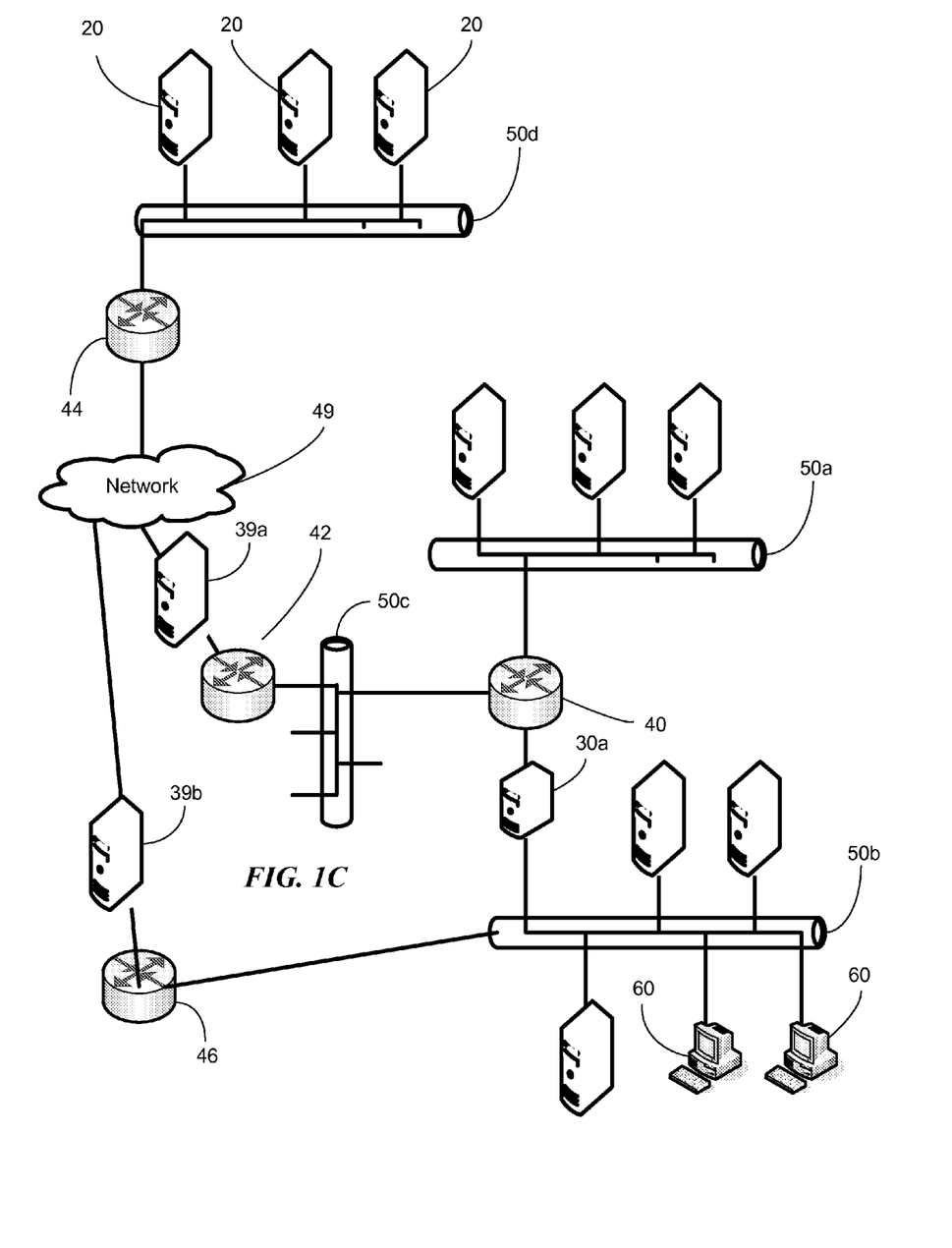

FIGS. 1B and 1C illustrate alternative example computer network environments in which implementations of the present invention have application. Routers 40, 42, 44 and 46 and networks 50*a*, 50*b*, 50*c* interconnect server(s) 20, proxy (ies) 30, client(s) 60 and other hosts operably connected to network 49. Networks 50*a*, 50*b*, 50*c* may comprise Local Area Networks (LANs) implemented by one or more switches, hubs, bridges, wireless access points, and/or other network devices. In one embodiment, networks 50*a*, 50*b*, 50*c* are Ethernet (IEEE 802.3) networks; however, other link layer protocols can be employed.

Servers 20 host one or more network applications, such as a web site or an enterprise business application, accessible to one or more clients 60. Servers 20 may include HTTP server, file server, media server, streaming media server and/or other functional modules to deliver network applications over the computer network environment. Servers 20 may establish HyperText Transport Protocol (HTTP) and/or TCP connections directly with clients 60 and/or with proxies 30 that proxy transactions between servers 20 and clients 60. Clients 60 are computing systems, such as desktop computers, laptop computers, and mobile devices that host client applications that access servers 20 and other hosts operably connected to the computer network environment.

A proxy 30 is an intermediate system that is functionally situated between a client 60 and a server 20 of a transaction. Various types of proxies exist. In Web access, a proxy can act as a web cache to reduce information access latency and bandwidth consumption. A proxy located in front of a group of origin servers, such as a reverse proxy or surrogate, offers load balancing capability and hides the identities of those servers. In addition to caching and load balancing, proxies can provide many other types of services including user authentication, connection acceleration, redirection, request and response filtering, access logging, translation and transcoding, virus scanning and spyware removal. For example, a proxy 30 can accelerate SSL connections by off-loading computation intensive cryptographic operations to built-in crypto hardware; a proxy can translate web page content from one language into another before presenting the information to the user; a proxy can perform compression and decompression over slow or cost sensitive links. Proxies can also act as provisioned service access points to traverse firewalls. An intelligent information security proxy is a complex network appliance that is comprised of both hardware and software, which facilitates the construction of intelligent and fine-grained policy rules, and is the enforcer of those policies.

Proxies 30, in a particular implementation, are network proxies, such as forward (gateway) proxy caches or reverse proxy caches, that operate explicitly or transparently to clients 60. Proxies 30 are operative to terminate connections on the application and/or transport layer with clients 60, and establish application and/or transport layer connections with servers 20. Proxies 30 can apply one or more policies—such as security policies, caching policies and the like—when intermediating connections between servers 20 and clients 60. In a particular embodiment, proxies 30 implement a redirection protocol to negotiate and establish one or more service groups with router 40. Definition of the Service Groups allows proxies 30 to act as proxy caches for one or more servers 20, as discussed below. Alternative embodiments are also possible. For example, as FIG. 1C illustrates, the proxies may be transparent proxies, such as proxy 30a, disposed between network 50b and router 40 to obviate the need for redirection mechanisms.

Routers 40, 42, 44, 46 are network devices that route packets according to information at Layer 3 (or Network Layer) of the Open Systems Interconnection (OSI) Reference Model. Routers 40, 42, 44, 46 can be IPv4-capable, IPv6 capable or implement dual stacks capable of supporting both IPv6 and IPv4 routing functions. In the implementation shown in FIG. 1B, router 40 can be configured to redirect network traffic to one of the proxies 30 to allow the proxies to intermediate transactions between clients 60 and servers 20. In a particular embodiment, router 40 can implement a cache communication protocol, such as the Web Cache Communications Protocol (WCCP) specified by Internet Draft "Web Cache Communication Protocol V2.0," {http://tools.ietf.org/id/draft-wilson-wrec-wccp-v2-01.txt}, which is incorporated by reference herein. In a particular implementation, router 40 is operative to negotiate and configure one or more WCCP Service Groups with one or more proxies 30. Each Service Group identifies the attributes defining the packets (e.g., IP addresses, TCP port numbers, etc.) that router 40 should redirect to one of the proxies 30 in the Service Group. Of course, other redirection mechanisms and protocols can be used.

As FIG. 1B illustrates, proxies 30 and router 40 are in the same broadcast or Layer 2 domain. In other embodiments, proxies 30 and router 40 may be in different broadcast or Layer 2 domains. Still further, as discussed below, embodiments of the invention can operate in a wide variety of network configurations and topologies. As FIG. 1C illustrates, for example, proxies 30 may be physically connected to one or more access links or other strategic locations in a network to obviate the need for redirection mechanisms.

B. Example Proxy Architecture

Figure 3:
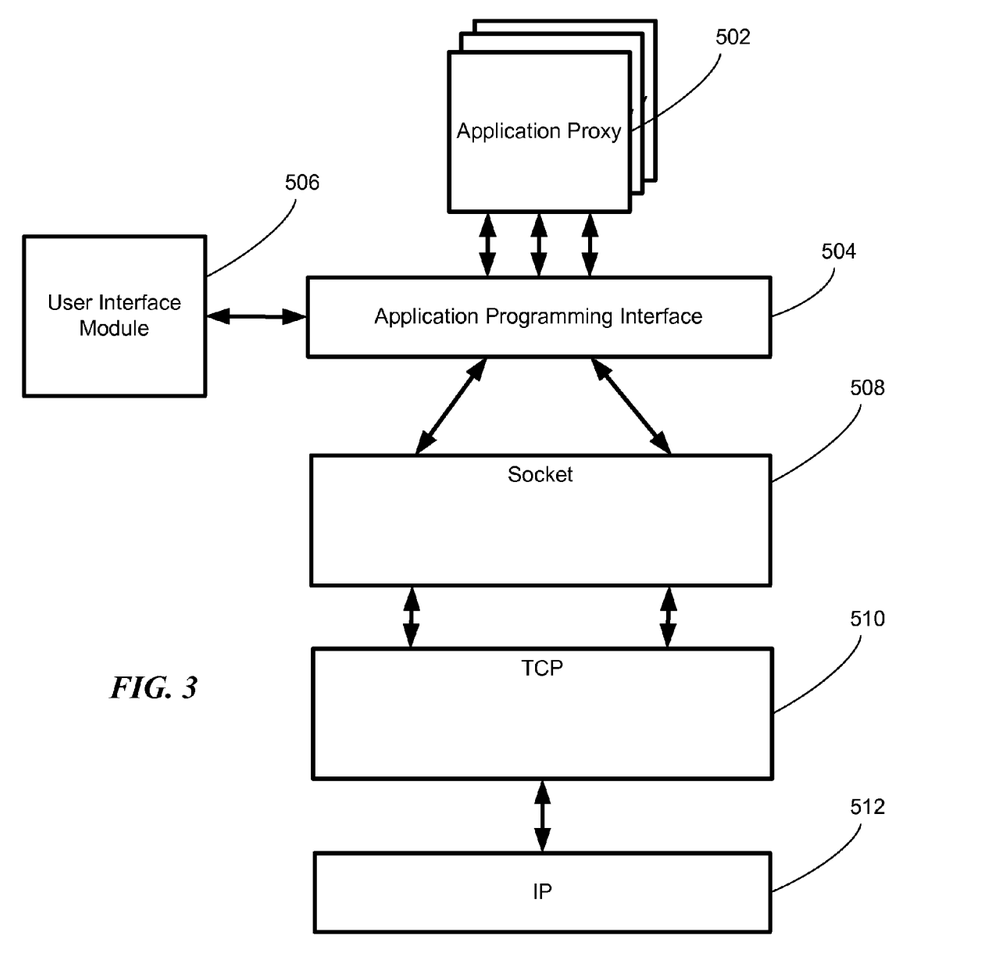
FIG. 3 is a block diagram illustrating functional modules of a proxy according to one possible embodiment of the invention.

Proxy applications—such as web caches and network security or firewall devices—typically operate at Layer 7 of the OSI Reference Model; however, as part of such functionality, these proxies may also implement lower layer protocols, such as the TCP/IP protocol suite. FIG. 3 sets forth an example functional architecture for proxy 30 according to one possible implementation of the invention. Proxy 30 hosts one or more application proxies 502. Application proxy 502 is a module that proxies application-level transactions between clients 60 and servers 20. In a particular implementation, application proxy 502 emulates an application server to clients 60 and emulates a client to application servers 20. Application proxy 502 can be configured to proxy a variety of different applications, such as Domain Name System (DNS) applications, Secure Sockets Layer (SSL) applications, HyperText Transport Protocol (HTTP) applications, File Transfer Protocol (FTP) applications, Multimedia Messaging Service (MMS) applications, Instant Messaging (IM) applications, and the like. User interface module 506 includes functionality that supports interface configuration and workflows according to which a network administrator may configure proxy 30.

Socket layer 508 provides a software endpoint for two-way communications between two application programs across a network. A given socket instance is typically bound to a port number so that a transport layer, such as Transmission Control Protocol (TCP) layer 510, can identify the application, to which that data is destined to be sent. To support various proxy operations, an application proxy 502, such as a HTTP proxy, has a socket that is bound to a specific port number. The application proxy 502 listens to the socket for requests transmitted by clients. In addition, socket layer 508 also supports client-side functions, which application proxy(ies) 502 utilize to initiate connections with application servers 60 on behalf of clients 20. Socket layer 508 may includes an IPv4 socket module (not shown), which supports connections with IPv4 resources, and an IPv6 socket module (not shown), which supports connections with IPv6 resources. Transmission Control Protocol (TCP) layer 510 implements transport layer functions, such as connection establishment, end-to-end flow control, and reliable delivery. As discussed below, TCP layer 510 can also implement some or all of the asymmetric routing detection operations described below. Proxy 30 may include additional transport layers, such as the User Datagram Protocol (UDP), as needed to support various network applications. Lastly, IP layer 512 is a software module that implements IPv4 and/or IPv6 network layer protocol functions. Not illustrated, for purposes of clarity, are additional lower layers, such as link and physical layers of proxy 30.

Figure 4:
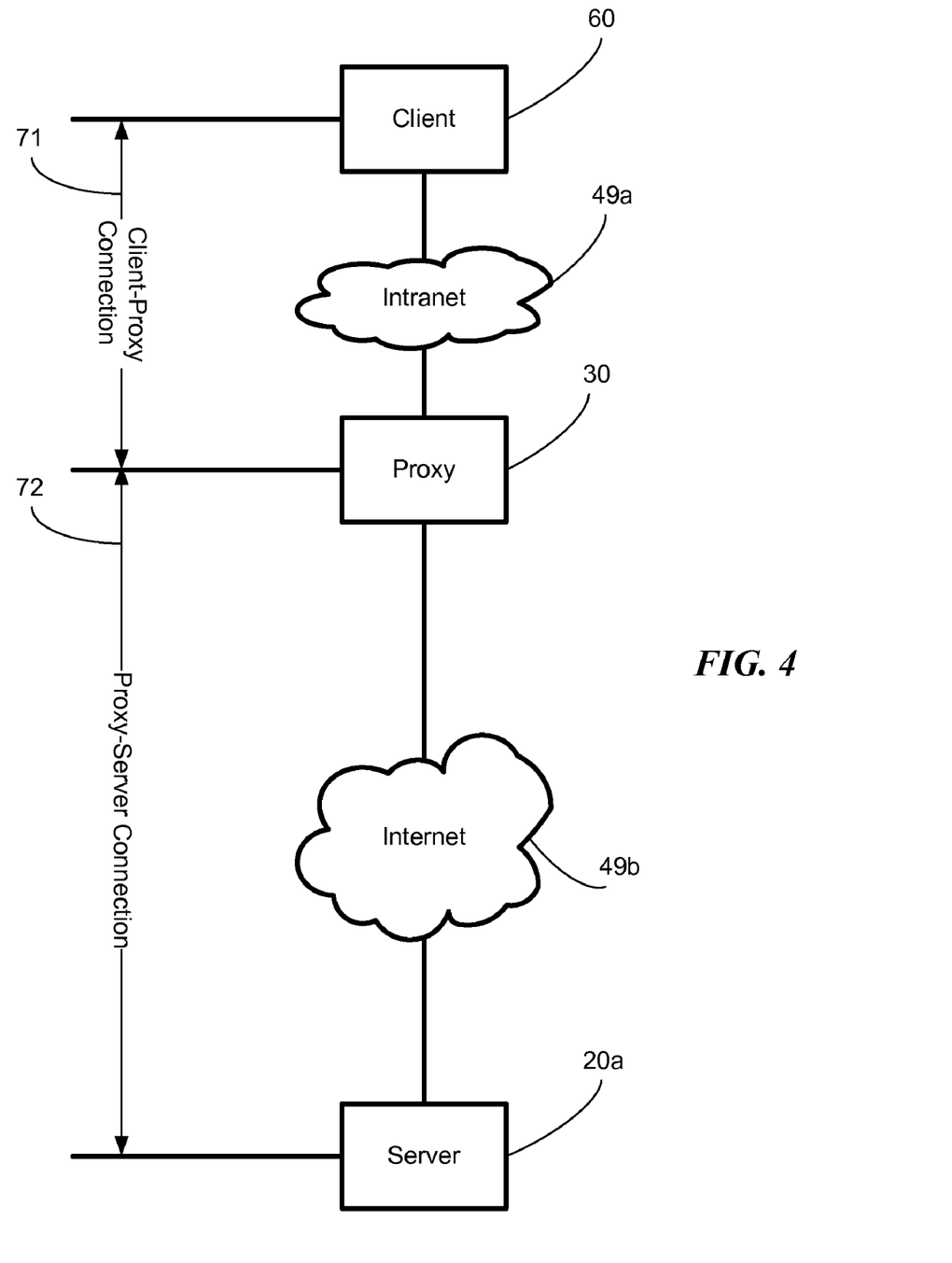
FIG. 4 is a schematic diagram illustrating connection splitting among a client, proxy and a server.

As FIG. 4 illustrates, a client-server transaction, such as an HTTP transaction, may involve two (and, in some architectures, more than two) application/transport layer connections due to interception and processing of client and server messages by proxy 30 at the application layer. When a client 60 initiates an HTTP session with a server 60, it generally initiates a transport layer connection, such as a TCP connection, by transmitting a TCP SYN packet to initiate the three-way handshake, the conclusion of which establishes a TCP connection. When proxy 30 intercepts a connection-initiating message from a client 60, such as a TCP SYN packet, the proxy 30 establishes or terminates the connection with the client 60 (here, client-proxy connection 71) and establishes a new transport layer connection 72 with server 60 directly, spoofing both the client and the server on the respective connections. Proxy 30 maintains a mapping between connection 71 and connection 72 to forward data between the client 60 and server 20. Generally speaking, each of the connections 71, 72 can be identified by a unique tuple including the client IP address, client port number, server IP address, server port number and a protocol identifier. The client port numbers, as well as various state information (sequence numbers, and the like), will be different between the two connections 71, 72. However, since the proxy spoofs both the client and the server (i.e., uses their respective IP addresses), an asymmetric routing condition may cause packets transmitted from server 20 to evade proxy 30 and be transmitted directly to client 60, or vice versa. Referring to FIG. 1A, for example, packets sourced from client 60 may traverse network path segment 99a, while packets sourced from server 20 on the same TCP connection may traverse network path segment 99b. In one example scenario, assume that client 60 initiates a TCP connection by transmitting a TCP SYN packet, which proxy 30 intercepts. Proxy 30 transmits a TCP SYN packet, spoofing client 60, over network path segment 99a. In response to a TCP SYN packet, server 20 generates and transmits a TCP SYN/ACK packet. If an asymmetric routing condition exists, then this packet may traverse network path segment 99b. Firewall 39b may filter this packet because it did not see the initial TCP SYN packet and therefore has no state information for the TCP connection. Operation of firewall 39b, therefore, may prevent proxy 30 from detecting asymmetric routing with respect to the proxy-server connection 72. In addition, even if firewall 39b does not filter the SYN/ACK packet, firewall 39a may filter the TCP RESET packet that client 60 would transmit in response to the SYN/ACK packet.

C. Example Operation

The following describes two processes for detecting asymmetric routing conditions in the network deployment architectures described above. A first process detects asymmetric routing at connection initiation, while the second process can detect asymmetric routing that may occur after connection initiation.

Asymmetric Routing Detection at Connection Initiation

Figure 5:
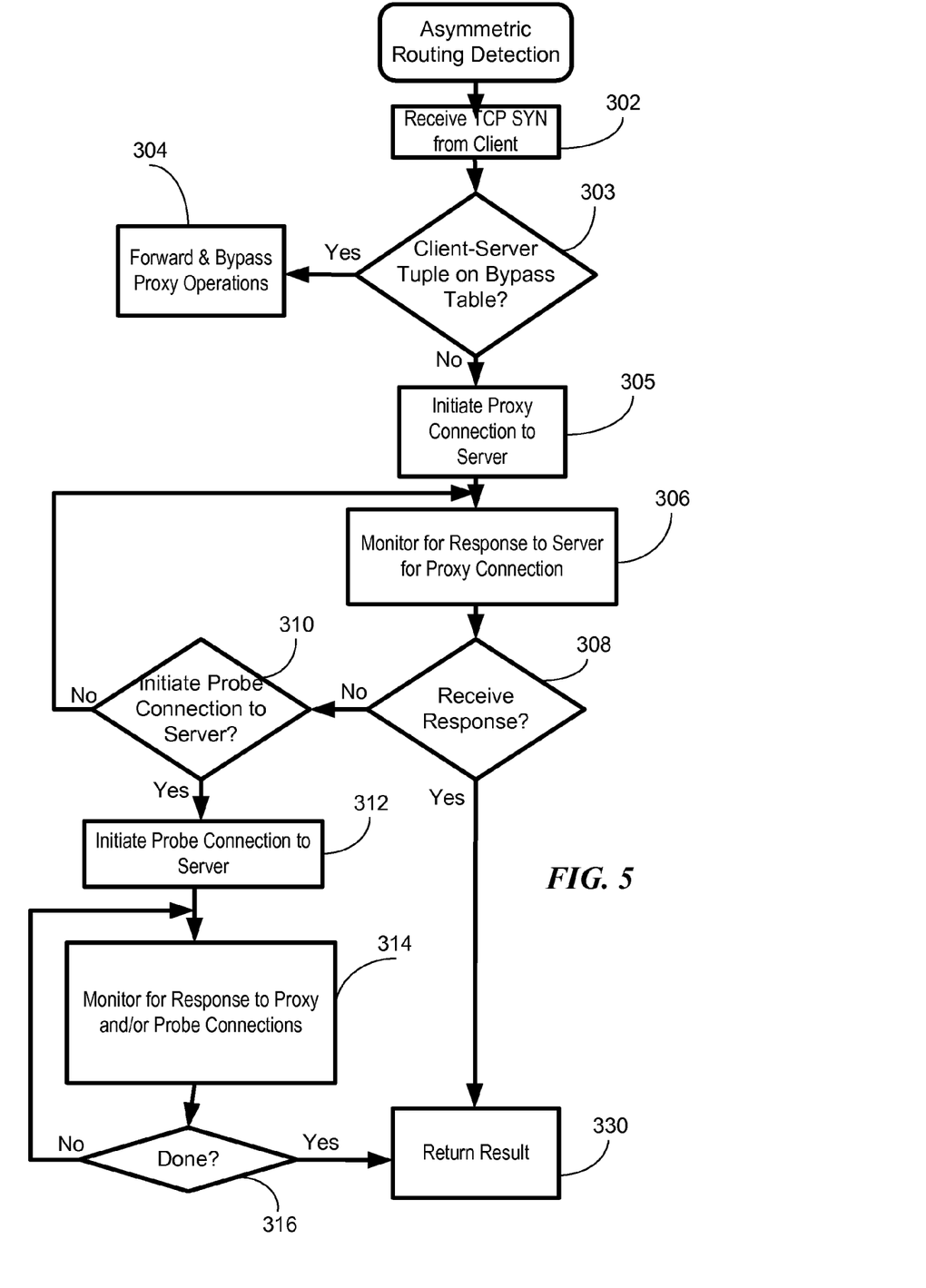
FIG. 5 is a flow chart illustrating an example method that can be implemented in connection with a proxy to detect asymmetric routing.

FIG. 5 illustrates a process flow for detecting asymmetric routing at initiation of a connection. As FIG. 5 illustrates, the processes described herein may be implemented when client 60 attempts to open a connection with a server 60. As discussed above, client 60 transmits a connection-initiating message, such as a TCP SYN packet, which proxy 30 receives (302). Proxy 30 accesses a bypass table to determine whether a tuple comprising the client IP address and server IP address identified in the connection-initiating message has been added (303). If the bypass table contains a matching entry, proxy 30 forwards the connection-initiating message along the network and does not proxy the connection (304). As discussed below, an entry in the bypass table containing a tuple of the client IP address and server IP address may be added when an asymmetric routing condition is detected. By not proxying the connection between client 60 and server 20, the problems associated with asymmetric routing discussed above can be mitigated. In one implementation, a separate process may periodically scan the bypass table to collapse multiple entries that identify the same server IP address into one entry. To collapse these entries, the client IP address of the tuple is changed to a wildcard that matches all client IP addresses. Other implementations are also possible, such as applying a subnet mask to one or more of the client and server IP addresses in the entries.

If the bypass table does not contain the client/server IP address tuple (303), proxy initiates a proxy connection 72 to the server 20 by transmitting a connection-initiating message (e.g., TCP SYN packet) (305) and monitors for a response from the server 20 (306). If proxy 30 receives a response to the connection-initiating message (such as a TCP SYN/ACK packet) (308), the TCP layer 510 of proxy 30 can complete the connection handshake by acknowledging the response message. The TCP layer 510 can also handle other response types transmitted by the server 20 as well. In general, the TCP layer 510 will return information to the higher layer processes of proxy 30 indicating a successful connection or an error (330). Application proxy 502 can then communicate this information to client 60 by completing the client-proxy connection or returning an error as appropriate. Whether a connection is successfully established or not is handled by normal TCP layer processes. On the other hand, the failure to receive a responsive message at all may be indicative of asymmetric routing.

Generally, a TCP layer implementation transmits a TCP SYN packet and retransmits the TCP SYN packet a number of times if a response to the previously transmitted TCP SYN packet times out. As FIG. 5 illustrates, at some point while proxy 30 attempts to initiate the proxy-server connection 72, proxy 30 may initiate a probe connection to the server 60 (310, 312). In one implementation, the proxy 30 initiates a probe connection after the period of waiting for responses to two TCP SYN packets (one of which is retransmitted) have timed out. One skilled in the art will recognize, however, that when a probe connection may be initiated relative to a proxy connection, the proxy performing the probe is capable of a variety of alternatives and is the subject of a variety of engineering and design considerations. For example, the probe connection may be initiated concurrently with the proxy-server connection or after a fewer or greater number of TCP SYN packets have timed out on the proxy-server connection. For example, the probe connection may be initiated after N number of re-transmitted connection initiation messages, where N can equal 1 to X (where X is the total number of re-transmitted connection initiation messages until the proxy connection process times out and returns an error to a higher layer process. In one implementation, a delay between the proxy-server connection and the probe connection is preferred for efficiency reasons in order to allow the proxy-server connection to be established successfully without having to initiate the probe connection. Factors that may be considered are the time intervals between retransmits of the TCP SYN packets, the time interval until the TCP connection times out, the desired user experience, and the like.

Unlike the proxy-server connection, proxy 30 uses its own IP address when establishing the probe connection. In other words, even if asymmetric routing is present in the network, and if the server is online, the server response to the probe connection initiation message will reach proxy 30. In one implementation, the proxy 30 establishes a TCP connection, transmitting a TCP SYN packet having a source address identifying the proxy 30 and a destination address identifying the server 20. As with the proxy-server connection 72, the TCP layer 510 may transmit multiple connection messages and time out the entire connection if no response to any of the connections messages is received. As FIG. 5 illustrates, after proxy initiates a probe connection (312), it waits for a response to either or both of the proxy-server connection 72 and the probe connection (314, 316). The result returned by TCP layer 510, in this instance, depends on the events that occur on either or both of the proxy-server connection or the probe connection and, in some implementations, on the timing between initiations of the proxy-server connection and the probe connection.

The following sets forth one rule set that one implementation of the invention employs. If both the proxy-server connection 72 and the probe connection time out proxy 30 assumes that server 20 is offline and returns a timeout error on the client-proxy connection 71. If proxy 30 receives a TCP RESET from client 20 that corresponds to the proxy-server connection 72 (meaning that firewall 39b did not filter the TCP SYN/ACK sourced from server 20), proxy 30 identifies an asymmetric routing condition, adds the client/server IP address tuple to the bypass table and transmits a message, such as a redirection message (e.g., HTTP 302 message), to the client 60 that causes it to re-establish a connection to server 20. If a response is received from server 20 on the proxy-server connection, proxy 30 completes the connection handshake and terminates the probe connection regardless of whether a response from the server 20 on the probe connection is received. If a response is received from server 20 on the probe connection and the proxy-server connection times out, proxy 30 also assumes an asymmetric routing condition adds the client/server IP address tuple to the bypass table and transmits a redirection message (e.g., HTTP 302 message) to the client 60. In other implementations, if the delay between initiation of the probe connection and the proxy-server connection 72 is great enough, proxy 30 need not wait until the proxy-server connection 72 times out to identify an asymmetric routing condition. In some implementations, it may also be desirable to delay the probe connection relative to the proxy-server connection 72, but also modify the TCP layer implementation for the probe connection such that both the probe connection and proxy-server connection 72 time out at approximately the same instant.

As the foregoing illustrates, by attempting to open a probe connection to the server 20 using an IP address of the proxy 30, connectivity to the server 20 can be verified and asymmetric routing conditions detected in network environments where packets, such as a TCP SYN/ACK packet, transmitted from server 20 traverse a different network path (e.g., network path segment 99b in the example illustrated above) and are filtered by a network device (such as firewall 39b). Also, by attempting to open a probe connection to the server 20 using an IP address of the proxy 30, connectivity to the server 20 can be verified and asymmetric routing conditions detected in network environments where packets, such as a TCP RST packet, transmitted from client 60 traverse a network path (e.g., network path segment 99a in the example illustrated above) and are filtered by a network device (such as firewall 39a). Additionally, while asymmetric routing conditions may be relatively static, dynamic or unstable asymmetric routing conditions may also occur in the middle of active connections.

Asymmetric Routing Detection During Active Flows

Asymmetric routing can also occur after a TCP or other connection has been successfully established. For example, asymmetric routing can occur during an active exchange of packets on proxy-server connection 72, perhaps due to either router errors or changes or temporary instabilities in the routing infrastructure. As the result of asymmetric routing, packets on the proxy-server connection 72 transmitted from the server 20 may be routed directly to client 60 bypassing proxy 30. For example and with reference to FIG. 1B, even in the case where packets transmitted by server 20 on proxy-server connection 72 traverse the same network path as packets transmitted from proxy 30 to server 20, an overload condition at router 40 (implementing WCCP redirection), for example, may cause the packets to leak directly to client 60 as opposed to being redirected to proxy 30. Client 60 responds by transmitting TCP RESET packets.

There are at least two possible resultant scenarios. In a first scenario, if the client-to-server TCP RESET packet reaches the server 20 directly (bypassing proxy 30), then the server 20 will terminate the proxy-server connection 72. In this case, the very next TCP packet sent from proxy 30 to server 20 will trigger server 20 to respond with a TCP RESET packet. This TCP RESET packet may again be asymmetrically routed to the client 20, which simply drops the invalid TCP RESET packet transmitted from the server. This condition will persist until the proxy 30 exhausts its retransmission attempts and subsequently terminates the proxy-server connection 72. In a second scenario, the client-to-server TCP RESET packet reaches the proxy 30. Proxy 30, if configured according to prior art, will forward this TCP RESET packet to server 20 because this TCP RESET packet appears to be originated from the proxy itself and it is assumed that certain routing configurations may cause proxy 30 to receive a packet that it actually transmitted. Accordingly, proxy 30 accesses connection state information to determine whether it has indeed transmitted a TCP RESET packet.

Figure 6:
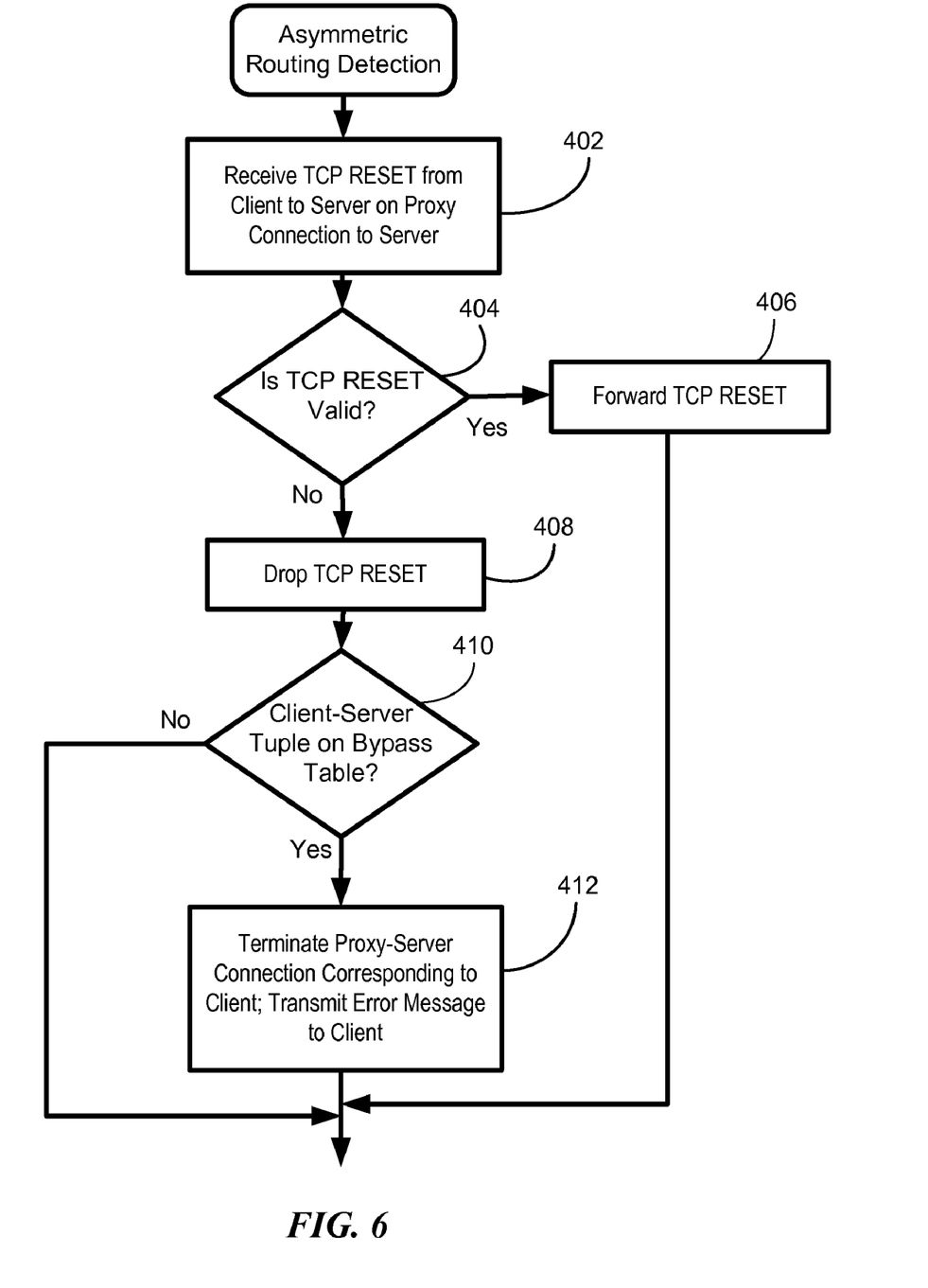
FIG. 6 is a flow chart illustrating another example method that can be implemented in connection with a proxy to detect asymmetric routing.

FIG. 6 sets forth an example process for detecting asymmetric routing during an active connection. As FIG. 6 illustrates, when proxy 30 receives a TCP RESET packet corresponding to proxy-server connection 72 and apparently sourced from client 60 (402), proxy 30 determines whether the TCP RESET packet is valid (404). Proxy 30 can verify the TCP RESET packet by accessing connection state information it maintains for TCP and other connections to determine whether it has indeed transmitted a TCP RESET packet on the proxy-server connection 72. If the TCP RESET packet is valid, proxy 30 forwards the TCP RESET packet (404). Otherwise, if the TCP RESET packet is invalid, proxy 30 drops the TCP RESET packet (408). Since the asymmetric routing condition may persist, the connection request (SYN, SYN/ACK) detection process discussed above will install the client/server IP address tuple into the bypass list. As FIG. 6 shows, if the client/server IP address tuple is contained on the bypass table (410), proxy 30 terminates the open proxy-server connection 72 and transmits an error message to the client 60 on the client-proxy connection 71, causing it to retry and establish connections directly with server 20 (412). In an alternative embodiment, proxy 30 may terminate all open proxy-server connections corresponding to the client and the server.

One advantage of this solution is that if the asymmetric routing condition is temporary, then the proxy-server connection 72 is not affected by the client-triggered TCP RESET packet. This may yield significant performance improvements, especially when misbehaving, unstable routers exist in the network, because the proxy 30 maintains the proxy-server connection 72 instead of tearing the connection down in response to only a temporary asymmetric routing condition. As discussed above, more stable asymmetric routing conditions will be detected and mitigated as new connections between client 60 and server 20 are established.

Some or all of the processes and operations set forth above can be implemented as extensions to a transport layer implementation, such as a TCP layer module. For example, when a higher layer process writes data to a socket, the TCP layer may initially attempt to open a proxy-server connection and, subsequently, initiate a probe connection to the server if a response to the initial TCP SYNs transmitted to the server on the proxy-server connection is not received. The second process can be similarly implemented as an extension to a TCP or other transport layer connection module.

D. Example Computing System Architectures

While the foregoing processes and mechanisms can be implemented by a wide variety of physical systems and in a wide variety of network environments, the proxy systems described below provide example computing system architectures for didactic, rather than limiting, purposes.

Figure 2:
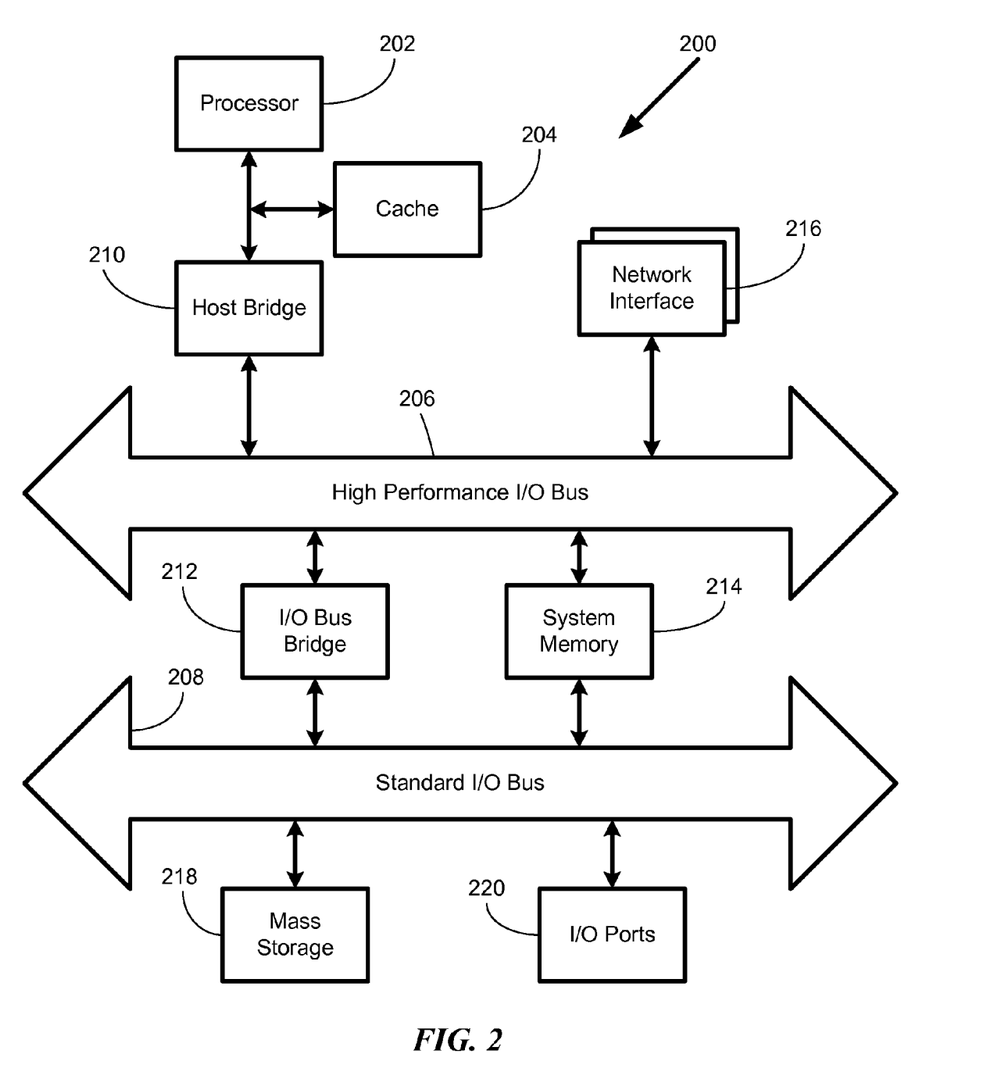
FIG. 2 is a functional block diagram illustrating an example network device hardware system architecture.

FIG. 2 illustrates an example computing system architecture, which may be used to implement a physical proxy or cache server. In one embodiment, hardware system 200 comprises a processor 202, a cache memory 204, and one or more executable modules and drivers, stored on a computer readable medium, directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above-described functions implemented in the cache or proxy 30, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments, only a single bus may exist, with the components of hardware system 200 being coupled to the single bus. Furthermore, hardware system 200 may include additional components, such as additional processors, storage devices, or memories.

As discussed below, in one implementation, the operations of one or more of the proxy or cache servers described herein are implemented as a series of executable modules run by hardware system 200. In a particular embodiment, a set of software modules or drivers implements a network communications protocol stack, including a link layer driver, a network layer driver, one or more transport layer modules (e.g., TCP, UDP, etc.), session layer modules, application layer modules and the like. The hardware system 200 may also host a proxy-router intercommunication module, such as a WCCP module, that negotiates associations with one or more routers for redirection of network traffic. The foregoing functional modules may be realized by hardware, executable modules stored on a computer readable medium, or a combination of both. For example, the functional modules may comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. Any suitable operating system may be used, such as the Windows Operating System offered by Microsoft Corporation, the Apple Macintosh Operating System, available from Apple Computer Inc. of Cupertino, Calif., UNIX operating systems, LINUX operating systems, BSD operating systems, and the like. Of course, other implementations are possible. For example, the proxy and caching functionalities described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present invention has been explained with reference to specific embodiments. For example, while embodiments of the present invention have been described as operating in connection with TCP and HTTP, the present invention can be used in connection with any suitable protocol environment. Furthermore, implementations of the invention can be used in systems directed to other types of proxies, such as protocol or network traffic accelerators, and packet inspection devices. Other embodiments will be evident to those of ordinary skill in the art. It is therefore not intended that the present invention be limited, except as indicated by the appended claims.

What is claimed is:

1. A method comprising:
    receiving, at a proxy, a first connection-initiating message from a client to a server, wherein the first connection-initiating message identifies a client network address as a source address and a server network address as a destination address;
    initiating a proxy-server connection between the proxy and the server by transmitting one or more second connection-initiating messages from the proxy to the server to establish a proxy-server connection, wherein the one or more second connection-initiating messages identifies the client network address as a source address and the server network address as a destination address;

monitoring for a first response from the server to the one or more second connection-initiating messages;
initiating a probe connection between the proxy and the server by transmitting one or more third connection-initiating messages from the proxy to the server to establish a probe connection, wherein the one or more third connection-initiating messages identifies a proxy network address as a source address and the server network address as a destination address;
monitoring for a second response to the one or more third connection-initiating messages from the server;
detecting an asymmetric routing condition between the client and the server based on whether the first response and the second response are received at the proxy; and
terminating the probe connection if the first response corresponding to the proxy-server connection is received.

2. The method of claim 1 further comprising
adding, if the asymmetric routing condition is detected, an entry to a bypass data structure, the entry comprising the client network address and the server network address.

3. The method of claim 2 further comprising
transmitting, if the asymmetric routing condition is detected, a message to the client operative to cause the client to re-initiate a connection to the server.

4. The method of claim 2 further comprising
accessing, responsive to the first connection-initiating message, the bypass data structure to locate a matching entry including the client network address and the server network address; and
if the bypass table contains the matching entry, bypassing initiation of the proxy-server and probe connections and forwarding the first connection-initiating message to the server.

5. The method of claim 1 further comprising identifying the asymmetric routing condition if the proxy receives a connection-terminating message corresponding to the proxy-server connection, wherein the connection-terminating message is apparently sourced from the client.

6. The method of claim 1 further comprising identifying the asymmetric routing condition if the proxy receives the second response from the server corresponding to the probe connection and the proxy-server connection times out.

7. The method of claim 1 further comprising identifying the asymmetric routing condition if the proxy receives the second response from the server corresponding to the probe connection.

8. The method of claim 1 wherein initiating the probe connection is delayed relative to initiating the proxy-server connection.

9. An apparatus, comprising:
one or more network interfaces,
a memory;
one or more processors;
one or more code modules comprising computer-executable instructions stored on a computer readable medium, the instructions executable by the one or more processors, the instructions, when read and executed, for causing the one or more processors to:
receive a first connection-initiating message from a client to a server, wherein the first connection-initiating message identifies a client network address as a source address and a server network address as a destination address;
initiate a proxy-server connection with the server by transmitting one or more second connection-initiating messages to the server to establish a proxy-server connection, wherein the one or more second connection-initiating messages identifies the client network address as a source address and the server network address as a destination address;
monitor for a first response from the server to the one or more second connection-initiating messages;
initiate a probe connection with the server by transmitting one or more third connection-initiating messages to the server to establish a probe connection, wherein the one or more third connection-initiating messages identifies a proxy network address as a source address and the server network address as a destination address;
monitor for a second response to the one or more third connection-initiating messages from the server;
detect an asymmetric routing condition between the client and the server based on whether the first response and the second response are received at the proxy; and
terminate the probe connection if the first response corresponding to the proxy-server connection is received.

10. The apparatus of claim 9 further comprising computer-executable instructions for causing the one or more processors to
add, if the asymmetric routing condition is detected, an entry to a bypass data structure, the entry comprising the client network address and the server network address.

11. The apparatus of claim 10 further comprising computer-executable instructions for causing the one or more processors to
transmit, if the asymmetric routing condition is detected, a message to the client operative to cause the client to re-initiate a connection to the server.

12. The apparatus of claim 10 further comprising computer-executable instructions for causing the one or more processors to
access, responsive to the first connection-initiating message, the bypass data structure to locate a matching entry including the client network address and the server network address; and
if the bypass table contains the matching entry, bypass initiation of the proxy-server and probe connections and forward the first connection-initiating message to the server.

13. The apparatus of claim 9 further comprising computer-executable instructions for causing the one or more processors to
identify the asymmetric routing condition if a connection-terminating message corresponding to the proxy-server connection is received, wherein the connection-terminating message is apparently sourced from the client.

14. The apparatus of claim 9 further comprising computer-executable instructions for causing the one or more processors to
identify the asymmetric routing condition if the second response from the server corresponding to the probe connection is received and the proxy-server connection times out.

15. The apparatus of claim 9 wherein initiation of the probe connection is delayed relative to initiation of the proxy-server connection.

16. A method comprising
receiving, at a proxy, a first connection-terminating message corresponding to a proxy-server connection associated with a client, wherein the first connection-terminating message identifies a client network address associated with a client as the a source address and a server network address associated with the server as a destination address;

accessing state information corresponding to the proxy-server connection maintained at the proxy to determine whether the first connection-terminating message is valid, wherein the first connection-terminating message is valid if the proxy previously sent a second connection-terminating message, wherein the second connection-terminating message corresponds to the proxy-server connection and identifies the client network address associated with the client as the source address and the server network address associated with the server as the destination address;

dropping the first connection-terminating message at the proxy if the first connection-terminating message is not valid; and forwarding the first connection-terminating message at the proxy if the first connection-terminating message is valid.

17. The method of claim 16 further comprising accessing, responsive to an invalid connection-terminating message, a bypass data structure to locate a matching entry including the client network address and the server network address; and if the bypass table contains the matching entry, terminating the proxy-server connection between the proxy and the server.

18. A method, comprising:

initiating, at a first network device, a first connection with a server by transmitting one or more first connection-initiating messages to the server, wherein the one or more first connection-initiating messages identifies a client network address associated with a client as a source address and a server network address associated with the server as a destination address;

monitoring for a first response from the server to the one or more first connection-initiating messages;

initiating a probe connection to the server by transmitting one or more second connection-initiating messages to the server to establish a probe connection, wherein the one or more second connection-initiating messages identifies a proxy network address as a source address and the server network address as a destination address;

monitoring for a second response to the one or more second connection-initiating messages from the server;

detecting an asymmetric routing condition between the client and the server based on whether the first response and the second response are received at the first network device; and terminating the probe connection if the first response corresponding to the proxy-server connection is received.

* * * * *